Jan. 8, 1924.

J. W. COLEMAN

ANIMAL FEEDER

Filed Jan. 29, 1923

J. W. Coleman, Inventor

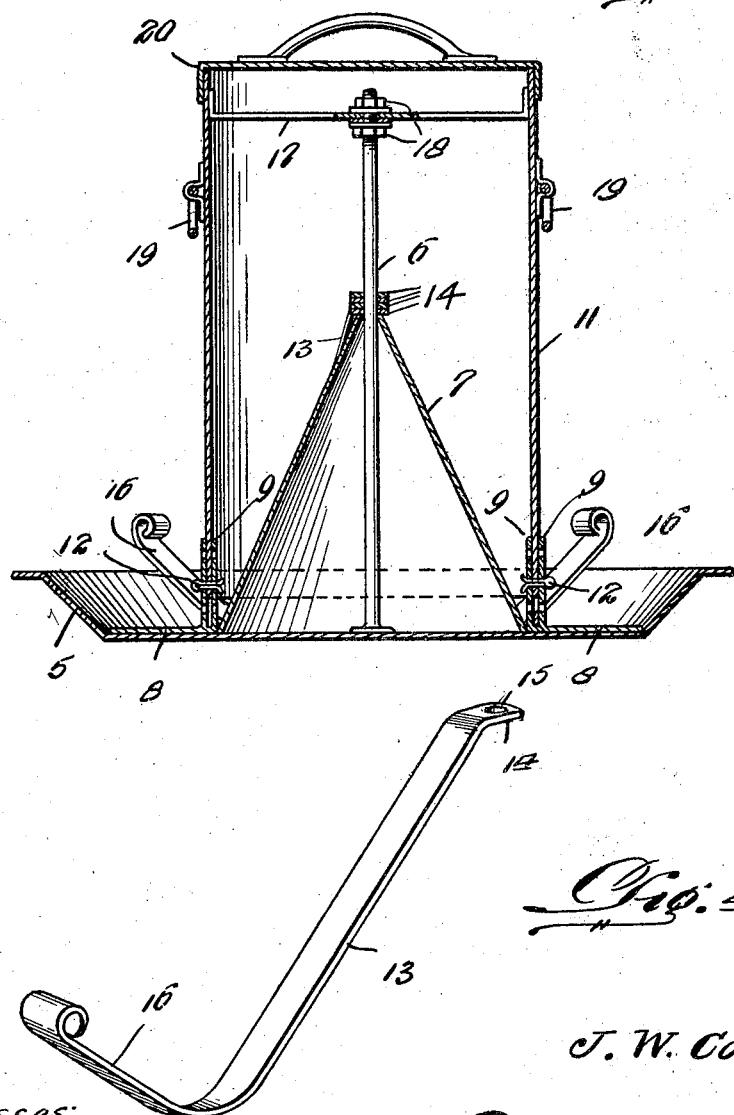

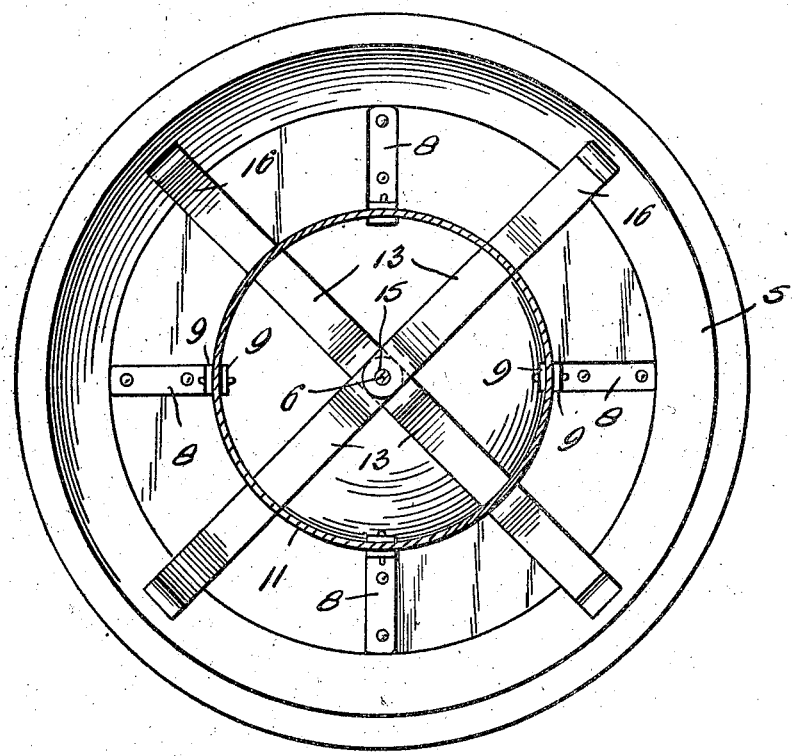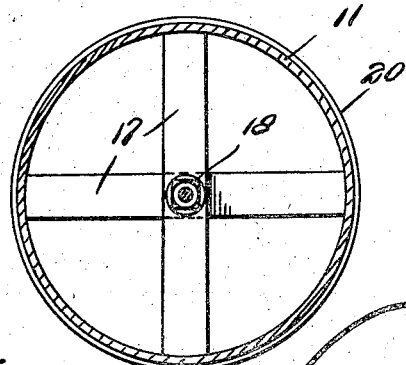

Patented Jan. 8, 1924.

1,479,896

UNITED STATES PATENT OFFICE.

JAMES W. COLEMAN, OF MOULTRIE, GEORGIA.

ANIMAL FEEDER.

Application filed January 29, 1923. Serial No. 615,479.

*To all whom it may concern:*

Be it known that I, JAMES W. COLEMAN, a citizen of the United States, residing at Moultrie, in the county of Colquitt and State of Georgia, have invented certain new and useful Improvements in Animal Feeders, of which the following is a specification.

My invention relates to new and useful improvements in animal feeders and has for the primary object thereof, the provision of such a device wherein the flow of feed from the feed hopper to the trough is controlled by the routing of the animals in this trough.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 2 is a vertical transverse cross sectional view thereof, and

Figure 3 is a transverse cross sectional view upon the line 3—3 of Figure 1, looking downwardly in the direction of the arrows.

Figure 4 is a perspective view of one of the animal actuated feed agitating bars.

Figure 1:
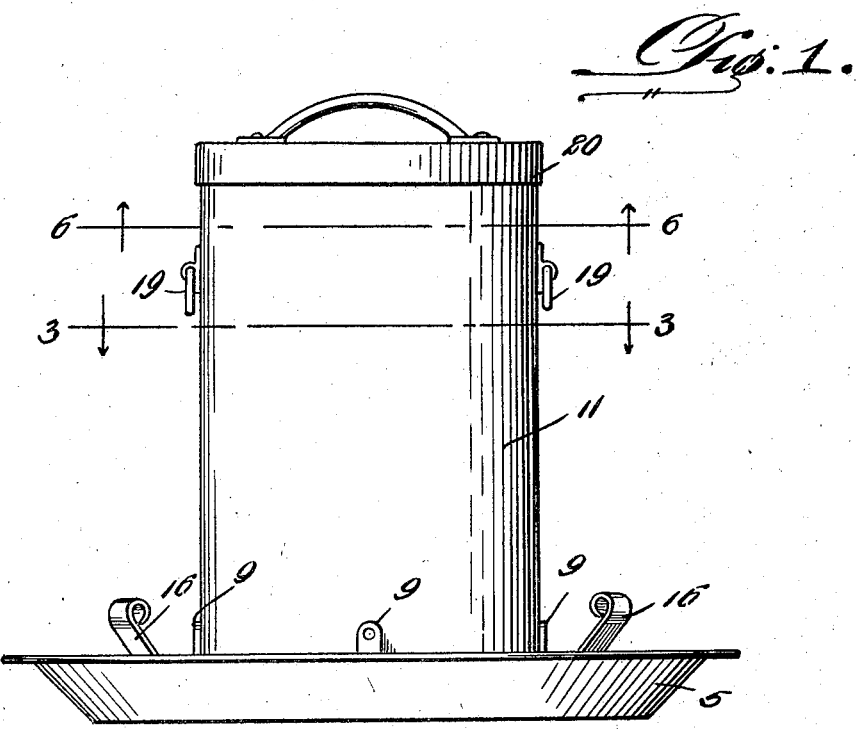
Figure 1 is an elevational view of an animal feeder constructed in accordance with the present invention.
Figure 5:
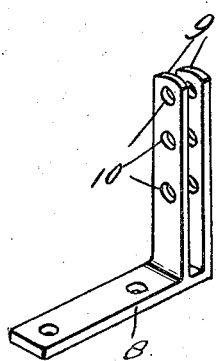
Figure 5 is a similar view of one of the supporting members for supporting the feed hopper within the trough and, Figure 6 is a transverse cross sectional view upon the line 6—6 of Figure 1, and looking downwardly in the direction of the arrows.

With particular reference to the drawings, my feeder constitutes the provision of a pan-shaped trough 5, upon which is centrally secured by soldering or the like, a vertically extending rod 6. Positioned over this rod 6 is an inverted cone-shaped feed distributing or equalizing member 7, the apex of the cone having an opening therein for permitting of the engagement of the cone over said rod.

Surrounding the enlarged end of the cone 7 and secured to the bottom of the pan shaped trough 5 are spaced bracket members 8 formed with a pair of vertically extending spaced arms 9. Each of these arms are provided with a series of openings 10, the openings in one arm being in alinement with those of the other.

Extending between the arms 9 of each of these bracket members 8 is the lower end of a cylindrical feed hopper or container 11, which is adapted to be adjustably positioned in spaced relation to the bottom of the pan shaped trough 5 by cotter pins 12 extending between any desired ones of the openings in the spaced arms 9 of the bracket members 8, as more clearly shown in Figure 2.

Within the hopper or container 11 and adjacent the conical member 7 are pendent downwardly inclined agitating bars 13. As more clearly shown in Figure 4, the upper end of each of these bars 13 are bent forwardly as at 14 and have an opening 15 therein for engaging around the said vertical bar 6, and at a point thereon above the apex of the cone. The lower end of each of these bars are reversely bent as at 16, this portion extending outwardly of the lower open end of the hopper or container 11 and being of such a nature as to lie within the pan shaped trough 5 in a manner as shown in Figures 1 and 2.

The upper end of the vertical rod 6 is screw threaded as shown in Figure 2, whereby the same may be secured to a transverse strengthening rod 17 secured at its opposite ends within the hopper or container 11, and adjacent the upper end thereof. The securing means between the screw threaded end of the rod 6 and the strengthening bar 17 may be, and preferably is, of the ordinary nut fasteners 18, as shown in this figure. The hopper or container may be provided with carrying handles 19, and the upper open end of this hopper or container 11 receives any desirable form of closure cap 20.

The supporting brackets 8 for the hopper or container 11 are preferably four in number, and the same is true of the agitating bars 13, these bars adapted for swinging movement upon the vertical bar 6 between two adjacent brackets 8 by the animals routing within the pan or trough 5, and in view of the above description, it will at once be apparent that the space between the lower open end of the hopper or container 11 and the pan or trough 5 may be adjusted whenever desirable, and when the bars 13 are swung by the animals, the feed within the hopper 11, will be agitated for consequently assisting in the flow of the same between the conical distributor 7, and the lower open end of the said hopper.

While I have herein shown and described the preferred embodiment of the present invention, it is nevertheless to be understood that minor changes may be made therein, without departing from the spirit and scope of the invention as claimed.

What I claim as new is:

1. An animal feeder comprising a hopper having inclined walls on its lower end, a vertical shaft arranged centrally within the hopper, agitating elements pivoted on the shaft and having laterally extending arms disposed exteriorly of the hopper to be engaged by the animals to agitate the feed to cause the same to gravitate from the hopper.

2. An animal feeder comprising a hopper having inclined walls on its lower end, a vertical shaft arranged centrally within the hopper, agitating elements pivoted on the shaft and having laterally extending arms disposed exteriorly of the hopper to be engaged by the animals to agitate the feed to cause the same to gravitate from the hopper, a pan supporting the hopper, bifurcated supporting elements carried by the pan in which the hopper is mounted.

In testimony whereof I affix my signature.

JAMES W. COLEMAN.